June 3, 1969

A. L. KRIEGER ET AL 3,448,025
PHOTOELECTROPHORETIC IMAGING SYSTEM UTILIZING
A PROGRAMMED POTENTIAL APPLICATION
Filed Oct. 31, 1966

INVENTOR.
ARTHUR L. KRIEGER
IRA S. STEIN
BY VSEVOLOD TULAGIN

ATTORNEYS 3,448,025
PHOTOELECTROPHORETIC IMAGING SYSTEM UTILIZING A PROGRAMMED POTENTIAL APPLICATION
Arthur L. Krieger, Webster, and Ira S. Stein and Vsevolod Tulagin, Rochester, N.Y., assignors to Xerox Corporation, Rochester, N.Y., a corporation of New York
Continuation-in-part of application Ser. No. 452,651, May 3, 1965. This application Oct. 31, 1966, Ser. No. 590,666
Int. Cl. C23b 13/00; B01k 5/00
U.S. Cl. 204—181
11 Claims

ABSTRACT OF THE DISCLOSURE

A method of photoelectrophoretic imaging utilizing a programmed potential application. Potential application is increased after the electrodes are brought into contact with the imaging layer eliminating striations and mottling of the final image.

---

Figure 1:
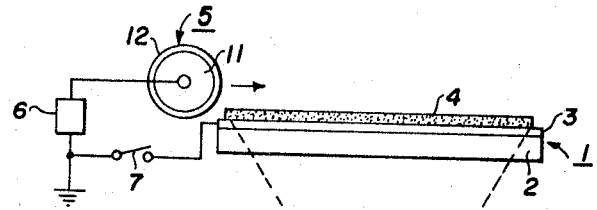

This invention relates in general to imaging systems and, more specifically, to improved electrophoretic imaging systems. This application is a continuation-in-part of our copending application Ser. No. 452,651, filed May 3, 1965.

There has been recently developed an electrophoretic imaging system capable of producing colored images which utilizes electrically photosensitive particles. This process is described in detail and claimed in copending applications Ser. Nos. 384,737, now U.S. Patent 3,384,-565; 384,681 abandoned in favor of continuation-in-part application, Ser. No. 655,023, now U.S. Patent 3,384,566 and 384,680 abandoned in favor of continuation-in-part application 518,041 now U.S. Patent 3,383,993, all filed July 23, 1964. In such an imaging system, variously colored light absorbing particles are suspended in a non-conductive liquid carrier. The suspension is placed between electrodes, subjected to a potential difference and exposed to an image. When these steps are completed, selective particle migration takes place in image configuration, providing a visible image at one or both of the electrodes. An essential component of this system is the suspended particles which must be electrically photosensitive and which apparently undergo a net change in charge polarity upon exposure to activating electromagnetic radiation, through interaction with one of the electrodes. In a monochromatic system, particles of a single color are used, producing a single colored image equivalent to conventional black-and-white photography. In a polychromatic system, the images are produced in natural color because mixtures of particles of two or more different colors which are each sensitive only to light of a specific wave-length or narrow range of wave-lengths are used.

In order to obtain images of optimum quality, it has been found that the potential applied across the imaging suspension between the electrodes should be on the order of several thousands volts. This high potential is maintained between a pair of electrodes one of which is conductive (called the "injecting" electrode) and the other of which has an insulating surface backed by a conductive core (called the "blocking" electrode). Ordinarily, one of these electrodes is transparent and the image to be reproduced is projected onto the imaging suspension through said transparent electrode. The electrodes are brought into contact with the suspension while the potential is imposed between them either before or during exposure.

It has often been found that images produced by the system broadly described above have uneven density and are blotchy and are mottled in appearance and have striations appearing across the image areas. It is theorized that the unevenness in the image is caused by varying field effects such as varying corona discharge or air ionization between the blocking electrode and the injecting electrode as the blocking and injecting electrodes are brought together and into contact with the imaging suspension. While the system described above is often capable of producing excellent images, at times, especially during periods of high relative humidity, the images produced are not of acceptable quality. Thus, there is a continuing need for improvements in electrophoretic imaging and for methods of eliminating undesirable uneven field effects during electrophoretic imaging.

It is, therefore, an object of this invention to provide an electrophoretic imaging system which is devoid of the above-noted disadvantages.

It is another object of this invention to provide a method of eliminating undesirable uneven field effects between electrodes in electrophoretic imaging systems.

It is another object of this invention to provide an electrophoretic imaging system capable of producing images of uniform density under varied humidity conditions.

The foregoing objects and others are accomplished, fundamentally, in accordance with this invention by programming the power supply so as to maintain the potential between the two electrodes at a relatively low potential as the electrodes are brought together and into contact with the imaging suspension and then to raise the potential between the electrodes to the degree necessary for optimum imaging.

Ordinarily, one of the electrodes is at least slightly flexible, e.g., the blocking electrode may be in the form of an endless web or roller having an elastomeric material over a core. When the electrodes are brought together, appreciable pressure is exerted on the imaging suspension, slightly deforming the flexible electrode. It has been found that if the electrodes are brought together with no potential applied across the suspension between the electrodes the imaging suspension tends to be squeezed out from the nip between the electrodes substantially destroying the imaging capabilities of the system. When a relatively low potential is maintained across the suspension between the electrodes the imaging suspension is not squeezed out and very little or no uneven field effects are observed. However, at low potentials the resulting images have low contrast, high background and often a shift in color balance such as to give the entire image a cast of a single color. When the potential maintained across the suspension between the electrodes is fairly high, on the order of several thousands volts, images of excellent quality, having good contrast, low background and good color balance are obtained. However, as described above, these images often have mottling and striations in image areas, primarily towards the edge at which the blocking electrode first engages the suspension. It has now been found that where the potential between the two electrodes is maintained in the range of about 500 to about 2,500 volts until the electrodes are both in contact with the imaging suspension and then the potential is raised to about 3,000 to about 6,000 volts during imaging excellent images will be produced with no evidence of uneven field effects. Therefore, these potential ranges are preferred. Images of optimum quality have been obtained with initial potential of about 2,000 volts and a potential of about 5,000 volts during imaging.

Figure 2:
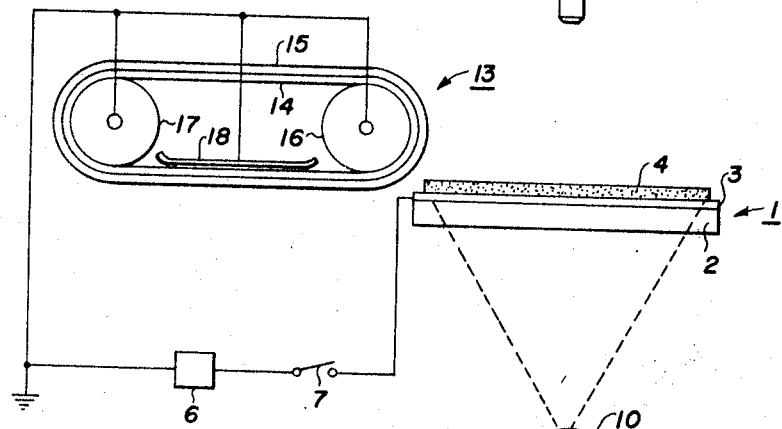

The details of the invention will be further understood upon reference to the drawings, wherein:

FIGURE 1 shows schematically an exemplary imaging system utilizing a blocking electrode in the form of a roller; and FIGURE 2 shows a second embodiment of the imaging system of this invention in which the blocking electrode is in the form of a web.

Referring now to FIGURE 1, there is seen a transparent electrode generally designated 1 which, in this exemplary instance, is made up of a layer of optically transparent glass 2 overcoated with a thin optically transparent layer 3 of tin oxide, commercially available under the name NESA glass. This electrode will hereafter be referred to as the "injecting electrode." Included on the surface of injecting electrode 1 is a thin layer 4 of finely-divided photosensitive particles dispersed in an insulating carrier liquid. The term "photosensitive" for the purposes of this application, refers to the properties of a particle which, once attracted to the injecting electrode, will migrate away from it under the influence of an applied electric field when it is exposed to actinic electromagnetic radiation. For a detailed theoretical explanation of the apparent mechanism of operation of the particle migration, see the above mentioned copending applications, Ser. Nos. 384.737; 384,681, and 384,680, the disclosure of which are incorporated herein by reference. Liquid suspension 4 may also contain a sensitizer and/or a binder for the pigment particles which is at least partially softenable in the suspending of carrier liquid. Adjacent to the liquid suspension 4 is a second electrode 5, hereafter called the "blocking electrode" which is connected to one side of the potential source 6 through a switch 7. The opposite side of potential source 6 is connected to the injecting electrode 1 so that when switch 7 is closed, an electric field is applied across the liquid suspension 4 between electrodes 1 and 5. An image projector made up of a light source 8, a transparency 9, and a lens 10 is provided to expose the dispersion 4 to a light image of the original transparency 9 to be reproduced. In the embodiment shown in FIGURE 1, electrode 5 is made in the form of a roller having a conductive central core 11 connected to the potential source 6. The core is covered with a layer of blocking electrode material 12, which may be, for example, Baryta paper. The pigment suspension is exposed to the image to be reproduced while a potential is applied across the blocking and injecting electrodes by closing switch 7. Roller 5 is caused to roll across the top surface of injecting electrode 1 with switch 7 closed during the period of image exposure. The imaging suspension may extend slightly beyond the image-forming area, as shown in FIGURE 1, so that the roller electrode 5 contacts suspension 4 slightly out of the image forming area. Power supply 6 is capable of imposing potentials of two magnitudes across the suspension during movement of roller 5. As described above, the potential will be relatively low, for example, from 500 to 2,500 volts, until roller 5 has come into contact with imaging suspension 4. Once roller 5 contacts imaging suspension 4 the potential is raised to a greater magnitude, for example, 3,000 to 5,000 volts. The potential is maintained at this magnitude during movement of the roller across injecting electrode 1. The potential may be changed from the lower to the higher magnitude by any conventional means. This might be switched manually, or a microswitch control for powder supply 6 may be placed in the path of roller 5 so that as roller 5 reaches the imaging suspension 4 it will close the microswitch and cause the potential provided by power supply 6 to be raised to the imaging potential.

During light exposure while roller 5 is maintained at the higher potential, exposed pigment particles originally attracted to electrode 1 migrate through the liquid and adhere to the surface of the blocking eletrode, leaving behind a pigment particle image on the injecting electrode surface which is a duplicate of the original transparency 9. After exposure, the relatively volatile carrier liquid evaporates off, leaving behind the particulate image. This particulate image may then be fixed in place as, for example, by placing a lamination over its top surface or by virtue of a dissolved binder material in the carrier liquid such as paraffin wax or other suitable binder which comes out of solution as the carrier liquid evaporates. About 3% to 6% by weight of paraffin binder in the carrier has been found to produce good results. The carrier liquid itself may be paraffin wax or other suitable binder material. In the alternative, the pigment image remaining on the injecting electrode may be transferred to another surface and fixed thereon.

FIGURE 2 shows a second embodiment of the imaging system of this invention in which the blocking electrode is in the form of a web mounted on a "tractor" means which moves across the surface of the injecting electrode. In the embodiment of FIGURE 2 there is included an injecting electrode 1 having coated thereon an imaging suspension 4 and an exposure system made up of light source 8, transparency 9 and lens 10, generally similar to those shown in FIGURE 1. In this instance, the blocking electrode is in the form of a "tractor" 13. Tractor 13 consists of a conductive belt 14 having on the surface thereof a layer of blocking electrode material 15, which may be Baryta paper. Belt 14 is entrained around a pair of rollers 16 and 17. Tractor 13 is adapted to be moved across the surface of injecting electrode 1 with the blocking electrode material in "tracking" contact with the imaging suspension. This tracking contact should be such as to produce no frictional movement between the blocking electrode surface and the imaging suspension. This may be accomplished by either driving rollers 16 and 17 at the proper speed or by friction between belt 14 and the coated injecting electrode 1. Uniform pressure between the belt and the imaging suspension is maintained by means of hold-down platen 18 other typical configurations which a "tractor" type blocking electrode may have are shown in copending application Ser. No. 452,651, filed May 3, 1965. A potential may be applied across the suspension between injecting electrode 1 and blocking electrode material 15 by means of variable power supply 6 which is connected to the conductive surface 3 of injecting electrode 1 through switch 7 and to the conductive cores of rollers 16 and 17 and to hold down platen 18. When operated according to the process of this invention, power supply 6 is set to supply a potential in the range of from about 500 to 2,500 volts as tractor 13 moves into position over injecting electrode 1. When blocking electrode material 15 completely covers imaging suspension 4, the potential is raised to a potential of about 3,000 to 6,000 volts during imaging. This change in potential may be accomplished manually or by means of a sensing device such as a microswitch which switches variable power supply 6 from a low potential to a higher potential when tractor 13 has reached the desired position.

Using any of the embodiments of this invention, the blocking electrode may be passed over the injecting electrode a plurality of times with cleaning between passes where required so as to produce improved resolution and improved color balance.

Any suitable insulating liquid may be used as the carrier for the pigment particles in this system. Typical carrier liquids include decane, dodecane, N-tetradecane, paraffin, beeswax or other thermoplastic materials, Sohio Odorless Solvent 3440 (a kerosene fraction available from the Standard Oil Company of Ohio) and Isopar-G (a long chain saturated aliphatic hydrocarbon available from Humble Oil Company of New Jersey). Voltages ranging from about 300 to about 5,000 volts of either positive or negative polarity may be used to produce good separation and excellent images in systems of the sort shown in the figures.

Any suitable electrically photosensitive particles may be used. Typical particle materials include: Algol Yellow GC, 1,2,5,6-di(c,c'-diphenyl)-thiazole-anthraquinone (General Dyestuff); Graphthol Rhodamine, the molybdenum lake of 3,6-bis (diethylamino)-9,2'-carbethoxy phenyl xanthenonium chloride (Sandoz Inc.); Bonodur Red B, 1-(4'-ethyl-5'-chloroazobenzene-2'-sulfonic acid)-2-hydroxy-3-napthoic acid calcium lake (American Cyanamide); Indanthrene Brilliant Orange RK, 4,10-dibromo - 6,12 - anthanthrone (General Dyestuff); Calcium Lithol Red, a calcium lake of 1-(2'-azonaphthalene-1'-sulfonic acid)-2-naphthol (Collway Colors); Indofast Violet Lake, a dichloro-9,18-isoviolanthrone (Harmon Colors); Cyan Blue GTNF, the beta form of copper phthalocyanine (Collway Colors); Indo-fast Yellow Toner, flauanthrone (Harmon Colors); Cyan Green 15–3100, a chlorinated copper phthalocyanine (American Cyanamid); Methyl Violet, a phosphotungstomolybdic lake of 4-(N,N',N'-trimethyl anilino)-methylene-N'',N''-dimethylanilimium chloride (Collway Colors); Diane Blue, 3,3'-methoxy-4,4'-diphenyl-bis (1''-azo-2''-hydroxy-3''-naphthanilide) (Harmon Colors); Monolite Fast Blue GS, a mixture of alpha and beta metal-free phthalocyanine (Arnold Hoffman Company); Duol Carmine, a calcium lake of 1-(4'-methylazobenzene)-2'-sulfonic acid)-2-hydroxy-3-naphthoic acid (E. I. du Pont de Nemours & Co.); Naphthol Red B, 1-(2'-methoxy-5' - nitrophenylazo) - 2-hydroxy-3''-nitro-3-naphthanilide (Collway Colors); Quindo Magenta RV–6803, a substituted quinacridone (Harmon Colors); Vulcan Fast Red BBE, 3,3'-dimethoxy-4,4'-biphenyl - bis(1'' - phenyl - 3''-methyl-4''-azo-2''-pyrazolin-5''-one) (Collway Colors); Watchung Red B, 1-(4'-methyl-5'-chloroazobenzene-2'-sulfonic acid)-2-hydroxy-3-naphthoic acid (E. I. du Pont de Nemours & Co.); and mixtures thereof. Other typical electrically photosensitive pigments include the following, described in the noted copending applications: 8,13-dioxodinaphtho - (1,2-2',3')-furan-6-carbox-4''-methoxyanilide (Ser. No. 421,377, filed Dec. 28, 1964); 1-cyano-2,3-(3'-nitro)-phthaloyl-7,8-benzopyrrocoline (Ser. No. 445,235, filed Apr. 2, 1965); N-2''-pyridyl-8,13-dioxodinaphtho-(1,2-2',3')-furan-6-carboxamide (Ser. No. 421,281, filed Dec. 28, 1964); various quinacridones as disclosed in application Ser. No. 468,935, filed July 1, 1965; anthraquinones as disclosed in application Ser. No. 467,344, filed June 28, 1966; azo pigments as disclosed in application Ser. No. 473,607, filed July 21, 1965; dioxazine pigments as disclosed in application Ser. No. 519,104, filed Jan. 6, 1966; and phthalocyanines as disclosed in application Ser. No. 560,603, filed June 27, 1966.

The following examples further specifically define the present invention with respect to electrophoretic imaging processes. Parts and percentages are by weight unless otherwise indicated. The examples below are intended to illustrate various preferred embodiments of the electrophoretic imaging process of the present invention.

All of the following examples are carried out in apparatus of the general type illustrated in the figures with the imaging mix 4 coated on a NESA glass substrate through which exposure is made. The NESA glass surface is connected in series with a switch, a variable potential source and the conductive center of a blocking electrode having a coating of Baryta paper on its surface. Where the blocking electrode is in roller configuration, the roller is approximately 2½ inches in diameter and is moved across the plate surface at about 4 centimeters per second. The plate employed is roughly 3 inches square and is exposed with a light intensity of about 8,000 foot-candles as measured on the uncoated NESA glass surface. Unless otherwise indicated, about 7 percent by weight of the indicated pigments in each example are suspended in Sohio Odorless Solvent 3440. All pigments which have a relatively large particle size as received commercially or as synthesized are ground in a ball mill for about 48 hours to reduce their size to provide a more stable dispersion which improves the resolution of the final images. Exposure is made with a 3200° K. lamp through a conventional "Kodachrome" color transparency.

EXAMPLE I

The particle suspension consists of a magenta pigment, Watchung Red B, a barium salt of 1-(4'-methyl-5'-chloroazobenzene-2'-sulfonic acid)-2-hydroxy-3-naphthoic acid, C.I. No. 15865, available from E. I. du Pont de Nemours & Co.; a cyan pigment, Monolite Fast Blue GS, the alpha form of metal-free phthalocyanine, C.I. No. 74100, available from the Arnold Hoffman Co.; and a yellow pigment, Algol Yellow GC 1,2,5,6-di(C,C'-diphenyl)-thiazolanthraquinone, C.I. No. 67300, available from General Dyestuff. This tri-mix, suspended in Sohio Odorless Solvent 3440 as described above, is tested in a device such as is shown in FIGURE 1.

(a) A NESA electrode is coated with the suspension and a potential of about 4,000 volts is imposed between the electrodes. The blocking electrode is then brought into contact with the imaging suspension and rolled across the injecting electrode during exposure. The image is of good quality except for severe mottling and striations extending in appreciable distance into the imaging area near where the roller first contacted the suspension.

(b) The NESA electrode is again coated with the particle suspension. A potential about 1,000 volts is imposed between the electrodes. The roller is moved across the injecting electrode during exposure while the potential is maintained at about 1,000 volts. No striations or mottling appear in image areas. However, the image produced has a strong magenta cast, low contrast, and high background.

(c) The NESA electrode is again coated with the imaging suspension. A potential of about 1,000 volts is imposed between the electrodes. The roller electrode is brought into contact with the imaging suspension just outside the image area. The potential is then increased to about 5,000 volts and the roller electrode is moved across the injecting electrode during image exposure. An excellent image of good color balance and density results with no evidence of mottling or striations in image areas.

Thus, surprising improvements in image quality result when the electrodes are maintained at a low potential until they are brought into contact with the suspension and the potential is then raised to a relatively high potential during imaging.

EXAMPLE II

The pigment suspension consists of a magenta pigment, Bonodur Red B, 1-(4'-ethyl-5'-chloroazobenzene-2'-sulfonic acid)-2-hydroxy-3-napthoic acid calcium lake, available from the American Cyanamid Company; a cyan pigment, Monolite Fast Blue GS and a yellow pigment, N - N'' - pyridyl-8,13-dioxodinaphtho-(1,2-2',3')-furan-6-carboxamide, prepared as described in copending application Ser. No. 421,281 filed Dec. 28, 1964. This suspension is then used to form images in a tractor-type apparatus such as that shown in FIGURE 2. This suspenion is tested as follows:

(a) The suspension is coated onto a NESA glass injecting electrode. The blocking electrode in tractor configuration is then tracked into place on the injecting electrode while no potential is imposed between the electrodes. It is observed that as the tractor moves across the injecting electrode the imaging suspension is squeegeed off leaving very little on the NESA surface. A potential of about 5,000 volts is then imposed between the electrodes and the electrodes are exposed to an image to be reproduced. The blocking electrode is then removed. A very faint image having poor color balance and extremely low density remains on the injecting electrode.

(b) The NESA electrode is again coated with the particle suspension. A potential of about 5,000 volts is imposed across the electrodes. The tractor is then tracked into position over the NESA electrode and the suspension is exposed to an original. Upon removal of the blocking electrode, a positive image is observed on the NESA surface conforming to the original. However, this image has severe striations and mottling across the image area.

(c) The NESA electrode is again coated with the particle suspension. A potential of about 2,000 volts is imposed on the electrodes. The tractor is tracked into position on the injecting electrode and the suspension is exposed to the original. After removal of the tractor, an image of low quality, having a strong magenta cast, low contrast and high background is observed on the NESA electrode. However, no striations or mottling in image areas is observed.

(d) The NESA electrode is again coated with the particle suspension. A potential of about 2,000 volts is imposed on the blocking electrode while the tractor is tracked into position on the NESA electrode. The potential is then increased to about 5,000 volts and the suspension is exposed to the color original to be reproduced. Upon removal of the tractor, an image conforming to the original of excellent color quality is observed on the NESA electrode. No striations or mottling is observed in image areas.

Although specific components and proportions have been described in the above examples relating to electrophoretic imaging systems, other suitable materials, as listed above, may be used with similar results. In addition, other materials may be added to the electrodes, particles, or particle-carrier suspension to synergize, enhance, or otherwise modify their properties. For example, the suspension and/or the particles may be dye sensitized or electrically sensitized, if desired.

Other modifications and ramifications of the present invention will occur to those skilled in the art upon a reading of the present disclosure. These are intended to be included within the scope of this invention.

What is claimed is:
1. A method of electrophoretic imaging comprising the steps of:
   (a) providing a pair of electrodes, one of which is at least partially transparent;
   (b) coating the surface of the first of said electrodes with a suspension comprising electrically photosensitive particles dispersed in a carrier liquid;
   (c) imposing a direct current potential of from about 500 to 2,500 volts between said electrodes;
   (d) bringing the second of said electrodes into contact with said suspension;
   (e) increasing said potential to from about 3,000 to about 6,000 volts; and
   (f) exposing said suspension to a pattern of actinic electromagnetic radiation while both said electrodes contact said suspension, whereby an image made up of migrated particles is formed on at least one of said electrodes.

2. The method of claim 1 wherein said second electrode is in the form of a tractor which is tracked into complete contact with said suspension while said potential is maintained at from about 500 to 2,500 volts, then said potential is increased to from about 3,000 to 6,000 volts and maintained thereat during exposure.

3. The method of claim 2 wherein said potential is initially about 2,000 volts and is increased to about 5,000 volts.

4. The method of claim 2 wherein said second electrode is a blocking electrode.

5. The method of claim 2 wherein said particles have a single color and a monochromatic image results.

6. The method of claim 2 wherein said suspension comprises particles of at least two colors and a polychromatic image results.

7. The method of claim 1 wherein said second electrode is in the form of a roller which is brought into contact with said suspension while said potential is maintained at from about 500 to 2,500 volts, then said potential is increased to from about 3,000 to about 6,000 volts and maintained thereat while said electrode is rolled across said suspension during exposure.

8. The method of claim 7 wherein said potential is initially about 2,000 volts and is increased to about 5,000 volts.

9. The method of claim 7 wherein said second electrode is a blocking electrode.

10. The method of claim 7 wherein said particles have a single color and a monochromatic image results.

11. The method of claim 7 wherein said suspension comprises particles of at least two colors whereby a polychromatic image results.

References Cited

UNITED STATES PATENTS

| | | | |
|---|---|---|---|
| 2,758,939 | 8/1956 | Sugarman | 117—17.5 |
| 2,940,847 | 6/1960 | Kaprelian | 96—1 |
| 3,068,479 | 12/1962 | Benn et al. | 346—74 |
| 3,251,685 | 5/1966 | Beckmore | 96—1 |
| 3,271,145 | 9/1966 | Robinson | 96—1 |

J. TRAVIS BROWN, Primary Examiner.

JOHN C. COOPER, Assistant Examiner.

U.S. Cl. X.R.

96—1, 1.2